(No Model.)
J. CREIGHTON & C. H. DRURY.
ATTACHMENT FOR PLOWS.
No. 453,108. Patented May 26, 1891.
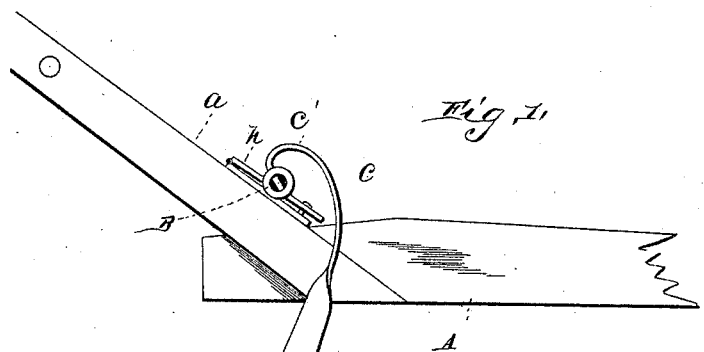
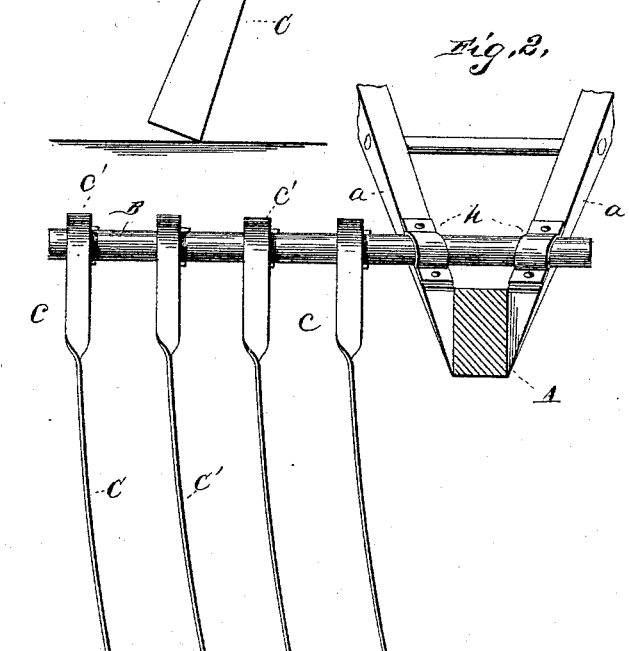
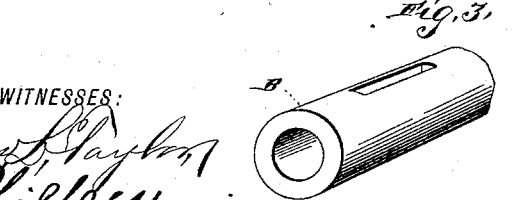
WITNESSES:
INVENTORS
John Creighton
C. H. Drury
BY
E. W. Anderson
their ATTORNEY.

United States Patent Office.

JOHN CREIGHTON AND CLINTON H. DRURY, OF HARTFORD, OHIO.

ATTACHMENT FOR PLOWS.

SPECIFICATION forming part of Letters Patent No. 453,108, dated May 26, 1891.

Application filed February 6, 1891. Serial No. 380,408. (No model.)

*To all whom it may concern:*

Be it known that we, JOHN CREIGHTON and CLINTON H. DRURY, citizens of the United States, and residents of Hartford, in the county of Trumbull and State of Ohio, have invented certain new and useful Improvements in Attachments for Plows; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view. Fig. 2 is a front view, partly in section; and Fig. 3 is a detail view.

This invention has relation to certain improvements in pulverizer attachments for plows, and is especially designed as an improvement over the construction set forth in Patent No. 439,586, issued to us October 28, 1890; and the invention consists in the novel construction and arrangement hereinafter described.

In the accompanying drawings, illustrating the invention, the letter A designates a plow having rigidly clamped to its handles $a$, just above the beam and projecting laterally on the mold-board side thereof, a rod or bar B, which may be either a solid piece or formed of gas-pipe of suitable size.

C C' represent a series of pulverizing-blades, four being shown, formed of spring metal and having their shanks $c$ twisted into plate or flat portions $c'$, standing at right angles to the plane of the blades, said shanks at their upper ends being turned over and keyed in slots $d$ in the rod B, no bolts or screws being employed. These blades are disposed edgewise, and may be straight or curved somewhat inwardly at their lower ends, as shown, the latter construction being found somewhat preferable in practice, although we d not wish to limit ourselves to any specific form of blade, as they may be varied, as found desirable, without departing from the spirit of this invention. It will be seen that the spring-metal character of these blades will allow an independent movement to each blade. By loosening the clamps $h$, which hold the rod B to the handles $a$, the said rod may be turned so as to bring the blades more or less perpendicular or oblique with relation to the ground, this providing for their action to a greater or less depth. The rod or bar B' may be either of wood or metal, and may be provided with an independent slot for each blade, or a longitudinal slot running in from its outer end, may be formed of sufficient length to receive the entire series which are keyed therein.

Having thus described our invention, what we claim as new, and desire to secure by Letters Patent, is—

1. The plow attachment comprising the rod or bar adjustably clamped to the handles and provided at its outer projecting end with a series of spring-metal blades having their curved shanks secured thereto, each blade having an independent yielding movement, substantially as specified.

2. The plow attachment comprising the slotted bar or rod adjustably clamped to the handles and provided at its outer projecting portion with a series of spring-metal blades having their turned upper ends inserted in the slots in said bar and keyed therein, substantially as specified.

In testimony whereof we affix our signatures in presence of two witnesses.

JOHN CREIGHTON.
CLINTON H. DRURY.

Witnesses:
JENNIE CARLTON,
PETER CARLTON.